(12) United States Patent
Ge et al.

(10) Patent No.: US 10,712,279 B2
(45) Date of Patent: Jul. 14, 2020

(54) ACTIVATABLE SURFACE ENHANCED RAMAN SPECTROSCOPY SENSOR STAGE

(71) Applicant: Hewlett-Packard Development Company, L.P., Houston, TX (US)

(72) Inventors: Ning Ge, Palo Alto, CA (US); Helen A. Holder, Palo Alto, CA (US); Steven J. Simske, Fort Collins, CO (US); Anita Rogacs, San Diego, CA (US); Viktor Shkolnikov, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/097,962

(22) PCT Filed: Jul. 22, 2016

(86) PCT No.: PCT/US2016/043630
§ 371 (c)(1),
(2) Date: Oct. 31, 2018

(87) PCT Pub. No.: WO2018/017129
PCT Pub. Date: Jan. 25, 2018

(65) Prior Publication Data
US 2019/0145897 A1    May 16, 2019

(51) Int. Cl.
*G01J 3/44* (2006.01)
*G01N 21/65* (2006.01)
(52) U.S. Cl.
CPC .......... *G01N 21/658* (2013.01); *G01J 3/4406* (2013.01)

(58) Field of Classification Search
CPC ...... G01N 21/64; G01N 21/65; G01N 33/543; G01J 3/44
See application file for complete search history.

(56) References Cited

U.S. PATENT DOCUMENTS

| | | | |
|---|---|---|---|
| 5,693,152 A | 12/1997 | Carron | |
| 8,559,002 B2 | 10/2013 | Tyagi et al. | |
| 9,255,843 B2 | 2/2016 | Yu et al. | |
| 9,278,855 B2 | 3/2016 | Tyagi et al. | |
| 2010/0253940 A1* | 10/2010 | Xia | G01N 21/658 |
| | | | 356/301 |
| 2012/0154791 A1 | 6/2012 | Kuo et al. | |
| 2012/0188540 A1 | 7/2012 | Bratkovski | |

(Continued)

FOREIGN PATENT DOCUMENTS

| | | |
|---|---|---|
| CN | 105092555 | 11/2015 |
| CN | 105648413 | 6/2016 |

(Continued)

OTHER PUBLICATIONS

Liu, X., et al., "Compact Shielding of Graphene Monolayer Leads to Extraordinary Sers-active Substrate with Large-area Uniformity and Long-term Stability", Nov. 30, 2015, http://www.nature.com/articles/srep17167.

*Primary Examiner* — Abdullahi Nur
(74) *Attorney, Agent, or Firm* — Rathe Lindenbaum LLP

(57) ABSTRACT

An activatable SEL sensor stage may include a substrate, cation metal-based material masses supported by the substrate and isolated from one another and dielectric capping layer over the cation metal-based material masses to inhibit oxidation of the cation metal-based material masses.

20 Claims, 4 Drawing Sheets

(56) References Cited

U.S. PATENT DOCUMENTS

| | | |
|---|---|---|
| 2014/0029002 A1 | 1/2014 | Wang et al. |
| 2014/0347661 A1 | 11/2014 | Kim |
| 2015/0002842 A1 | 1/2015 | Kim |
| 2016/0061737 A1 | 3/2016 | Ito et al. |

FOREIGN PATENT DOCUMENTS

| | | |
|---|---|---|
| JP | 2015163845 | 9/2015 |
| RU | 2543691 C2 | 3/2015 |
| TW | 201406646 | 2/2014 |

\* cited by examiner

ACTIVATABLE SURFACE ENHANCED RAMAN SPECTROSCOPY SENSOR STAGE

BACKGROUND

Surface enhanced luminescence (SEL) techniques, such as surface-enhanced Raman spectroscopy (SERS), utilize a surface, substrate or stage that enhances sensing sensitivity. The stage supports a solution or specific analyte during the sensing of light interactions with the analyte. The sensed light interactions may be used to identify characteristics of the analyte.

DETAILED DESCRIPTION OF EXAMPLES

The present disclosure describes various example surface enhanced luminescence (SEL) stages for SEL sensing. The stages facilitate the use of cation metal-based materials that may lead to a reduction in the cost of such stages. For example, the stages may facilitate the use of a silver-based material by inhibiting oxidation of the silver-based material until the stage is activated through the application of a stimulus. In some implementations, the stages facilitate selective activation of different isolated masses of the cation metal-based materials to customize or fine-tune performance of the stage.

Figure 1:
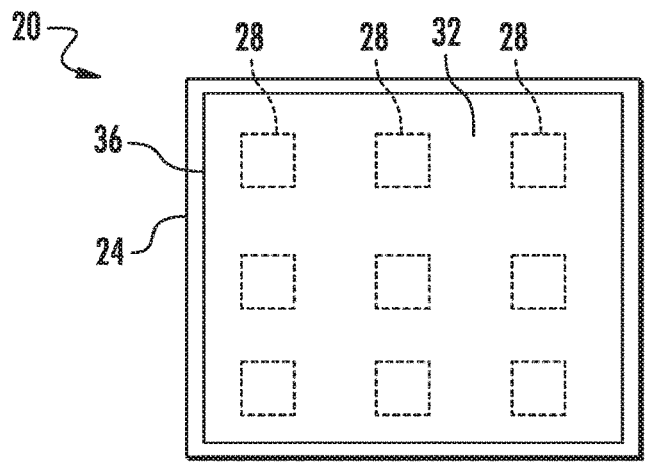
FIG. 1 is a top view of an example SEL stage.
Figure 2:
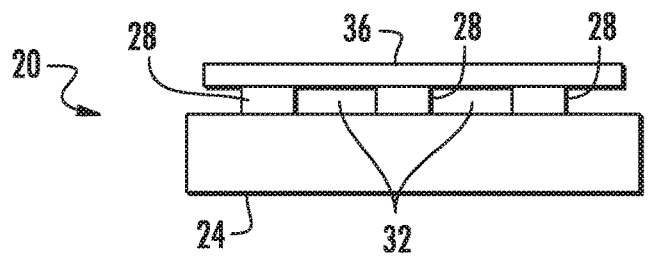
FIG. 2 is a sectional view of the example SEL stage of FIG. 1.

FIGS. 1 and 2 illustrate a portion of an example surface enhanced luminescence (SEL) stage 20. Stage 20 serves as a platform or underlying surface for supporting a solution or specific analyte being tested and analyzed using SEL. For purposes of this disclosure, a surface enhanced luminescence (SEL) stage comprises a surface that interact with the deposited analyte so as to enhance the intensity of the radiation scattered, reflected or reemitted by the analyte. Stage 20 enhances the amount of radiation or the number of photons that are scattered, reflected or re-emitted by the analyte upon being impinged by radiation from a radiation source. In one implementation, the SEL stage comprises enhanced fluorescence spectroscopy surfaces or enhanced luminescence spectroscopy surfaces. In one implementation, the SEL stage comprise surface enhanced Raman spectroscopy (SERS) surfaces.

Stage 20 facilitates the use of cation metal-based materials that may lead to a reduction in the cost of such stage 20. For example, in one implementation, stage 20 facilitates the use of a silver-based material by inhibiting oxidation of the silver-based material until the stage 20 is activated through the application of a stimulus. In some implementations, stage 20 facilitates selective activation of different isolated masses of the cation metal-based materials to customize or fine-tune performance of stage 20.

Stage 20 comprises substrate 24, cation metal-based material masses 28, diffusion barriers 32 and capping layer 36. Substrate 24 comprises the base layer of material that supports masses 28. In the example illustrated, substrate 24 may be formed from a material that is resistant to diffusion of the cation metal-based material of masses 28. In one implementation, substrate 24 comprises a diffusion barrier material having a diffusion coefficient less than that of silver ions. Examples of materials that may serve as a diffusion barrier and from which substrate 24 may be formed include, but are not limited to, SiN, SiC, TiN and $SI_3N_4$.

Cation metal-based material masses 28 comprise masses of cation metal-based material or materials that are supported above substrate 24 which are spaced from one another. Masses 28 comprise distinct islands of cation metal-based material or materials. In one implementation, each of masses 28 comprises a silver-based material. For purposes of disclosure, a silver-based material is a material that includes silver ions. For example, a silver-based material comprises bulk silver or silver oxide. The individual masses 28 are isolated from other masses 28 along the surface of substrate 28.

Diffusion barriers 32 extend between masses 28 and isolate masses 28 from one another. Diffusion barriers 32 have diffusion coefficients less than the diffusion coefficient of the cation metal-based material of the adjacent masses 28. In one implementation, diffusion barriers 32 are impermeable to diffusion of the cation metal-based material of masses 28. Diffusion barriers 32 inhibit masses 28 from diffusing into connection or contact with one another. In each instance, at least portions of each mass 28 facing capping layer 36 are not covered or blocked by diffusion barriers 32 such that masses 28, upon receiving a stimulus, may diffuse through the overlying capping layer 36.

In one implementation, diffusion barriers 32 completely surround the sides of each mass 28 and continuously extend from one mass 28 to another mass 28. In yet other implementations, diffusion barriers 32 continuously extend around the sides of each mass 28 so as to line each mass 28. In one implementation, diffusion barriers 32 comprise voids or spaces devoid of any solid or liquid, extending about the individual masses 28. In one implementation, the voids or spaces lack gas and are vacuum voids. In another implementation, the voids or spaces contain a gas such as air.

In still other implementations, diffusion barriers 32 comprise walls, coatings, films or layers of a solid or liquid diffusion impermeable material extending about the sides of masses 28 and between masses 28. The material or materials forming diffusion barriers 32 have a diffusion coefficient that is less than the diffusion coefficient of the cation metal-based material of masses 28. In one implementation, the material or materials forming diffusion barriers 32 are impermeable to diffusion by masses 28. Examples of materials from which diffusion barriers 32 may be formed include, but are not limited to, SiN, SiC, TiN, SI3N4 and their alloys, and alloys of WO.

Capping layer 36 comprises at least one layer of dielectric material extending over masses 28, sandwiching masses 28 between capping layer 36 and substrate 24. Capping layer 36 slows or inhibits oxidation of the cation metal-based materials forming masses 28. At the same time, capping layer 36 is formed from a material or a group of materials that block or resist diffusion of the cation metal-based material of masses 28, but which offer accelerated diffusion of masses 28 in response to the cation metal-based material being stimulated. Diffusion of the cation metal-based material of masses 28 through capping layer 36 results in the cation metal-based material depositing or forming upon the surface of capping layer 36 or results in the cation metal-based material masses 28 diffusing through capping layer 36 and any additional non-diffusion blocking layers of material that may exist between capping layer 36 and masses 28 or that may extend over and above capping layer 36.

In one implementation, capping layer 36 comprises a porous dielectric layer that has a low coefficient of diffusion with respect to a silver-based material but which offers an accelerated rate of diffusion for the silver-based material in response to the silver-based material being stimulated. For example, in one implementation, capping layer 36 may comprise TEOS oxide ($SiO_2$). In yet other implementations, capping layer 36 may be formed from other materials.

Although stage 20 is illustrated as comprising a two dimensional array of equally spaced masses 28, in other implementations, stage 20 may comprise other arrangements or patterns of isolated masses 28. For example, in one implementation, masses 28 may be provided with other predefined and controlled patterns. For example, in other implementations, masses 28 may be arranged in multiple groups or clusters, wherein the clusters are spaced from one another by first distance while the individual masses 28 of the individual clusters are spaced from one another by a second distance less than the first distance. Although masses 28 are illustrated as being square in shape, in other implementations, a mass 28 may have other shapes, such as circular, oval the like. Although masses 28 are each illustrated as having the same size, in other implementations, masses 28 may have different sizes. In some implementations, the size, layout and shape of masses 28 may be random, whereas in other implantations, at least one of the size, layout and shape of mass 28 may be precisely controlled or patterned. It should be appreciated that although substrate 24 is illustrated as extending beyond capping layer 36 for purposes of illustrating each of the layers in 1, substrate 24 and capping layer 36 may be coextensive.

Figure 3:
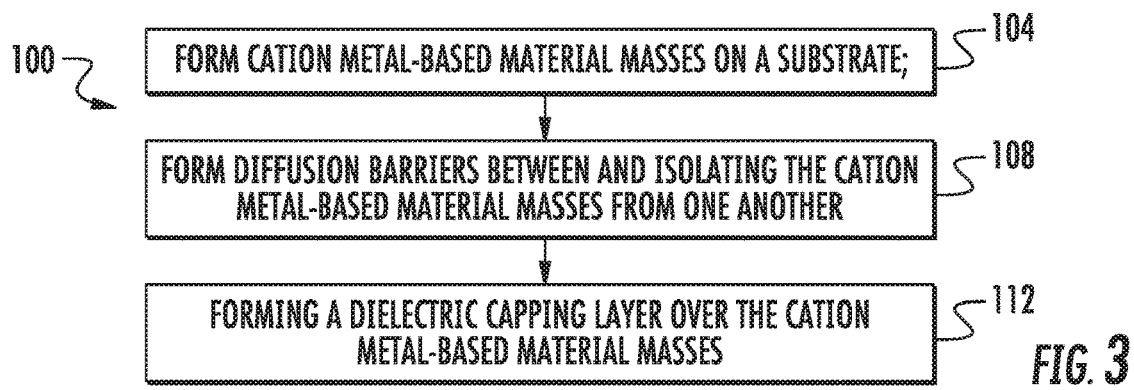
FIG. 3 is a flow diagram of an example method for forming an example SEL stage.

FIG. 3 is a flow diagram of an example method 100 for forming a SEL stage. For purposes of discussion, method 100 is described as being carried out to form the example SEL stage 20 shown in FIGS. 1 and 2. It should be appreciated that method 100 may likewise be utilized to form any of the example stages disclosed hereafter as well as other variations of SEL stage 20.

As indicated by block 104, cation metal-based material masses 28 are formed on a substrate 24. As indicated by block 108, diffusion barriers 32 are formed between the masses 28 so as to isolate the masses 28 from one another. In one implementation, material masses 28 may be formed upon substrate 24 prior to the forming of diffusion barriers 32 therebetween. In another implementation, the diffusion barriers 32 may first be formed, wherein the material masses are the formed between the already form diffusion barrier 32. In still other implementations, masses 28 and diffusion barrier 32 may be concurrently formed.

In one implementation, stage 20 may be formed by etching openings or wells into substrate 24, wherein substrate 24 comprises a layer of diffusion barrier material as described above. The cation metal-based material, such as silver or silver oxide, is then deposited over the etched substrate, filling in the etched cavities or recesses in the surface of substrate 24. Chemical mechanical polishing (CMP) or chemical mechanical planararization may then be used to remove those portions of the applied cation metal-based material extending above the etched wells, cavities or recesses. This results in distinct pockets in substrate 24 being filled with the cation metal-based material, wherein the substrate surrounding such pockets serves as diffusion barriers 32. The cation metal-based material filled wells, cavities or recesses are then covered through the application of capping layer 36, such as through plasma enhanced chemical vapor deposition (PEVCD). In other implementations, those processes identified in blocks 104, 108 and 112 may be carried out in other fashions.

Figure 4:
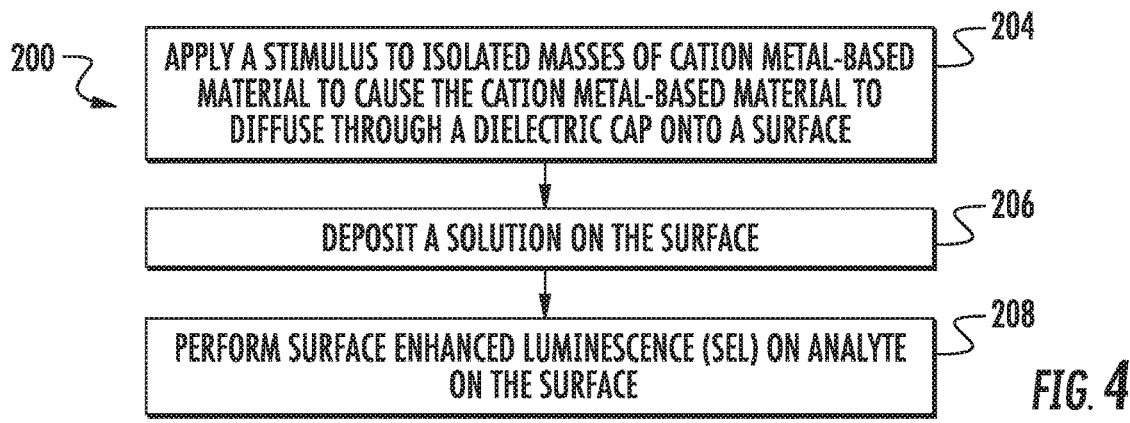
FIG. 4 is a flow diagram of an example method for activating and using a SEL stage.
Figure 5:
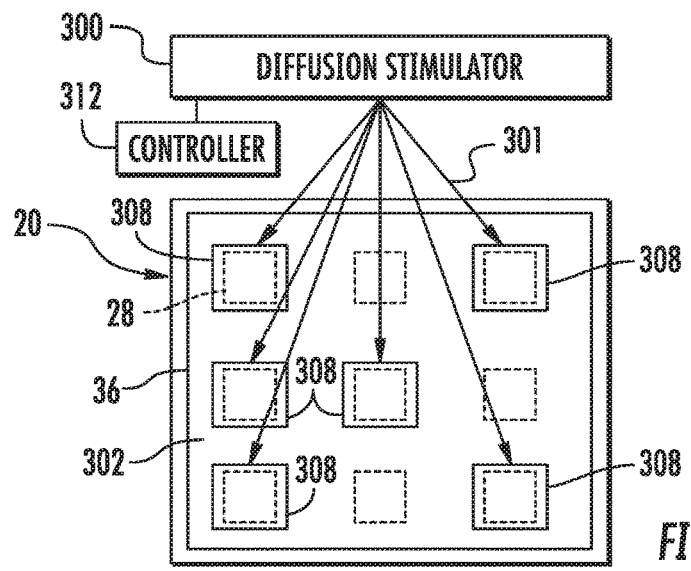
FIG. 5 is a top view of the example SEL stage of FIG. 1 during activation.
Figure 6:
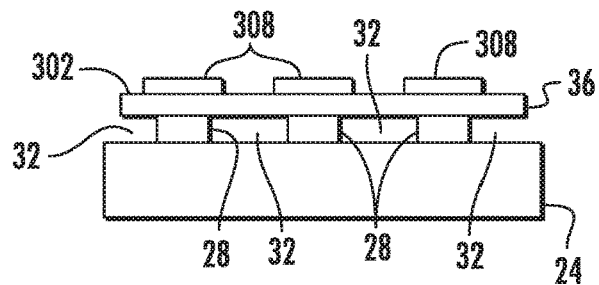
FIG. 6 is a sectional view of the example SEL stage of FIG. 1 after activation.
Figure 7:
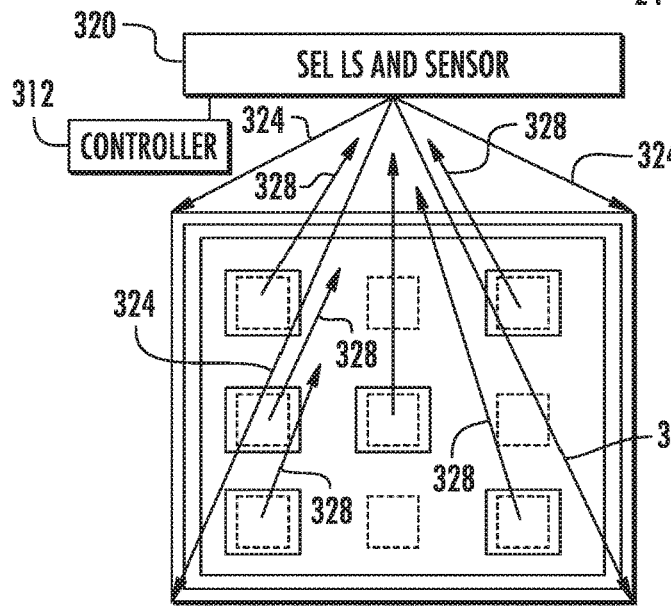
FIG. 7 is a top view of the example SEL stage of FIG. 5 following activation and during SEL sensing.
Figure 8:
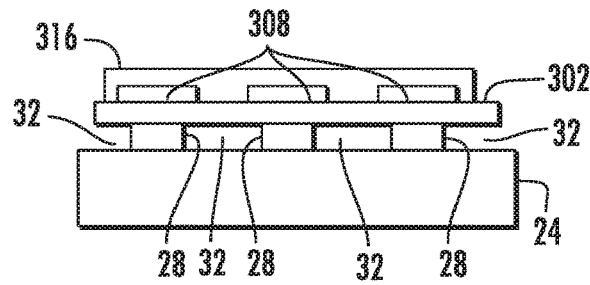
FIG. 8 is a sectional view of the example SEL stage of FIG. 7 during SEL sensing.

The SEL stage produced by method 100, such as SEL stage 20, slows or impedes oxidation and other reactions of the cation metal-based masses 32 until stage 20 is activated. Until such activation, the dielectric material of capping layer 36 prevents or slows contact of masses 28 with oxygen. FIG. 4 is a flow diagram illustrating an example method 200 for the activation and use of such a SEL stage produced by method 100, such as SEL stage 20. FIGS. 5 and 6 illustrate one example of the activation of SEL stage 20, readying SEL stage 20 for use in SEL. FIGS. 7 and 8 illustrate one example use of the activated SEL stage 20 during SEL sensing.

As indicated by block 204 and illustrated in FIGS. 5 and 6, diffusion stimulator 300 applies a stimulus 301 to the isolated masses 28 of the metal-based material below capping layer 36. The stimulus causes the cation metal-based material of those masses 28 to which stimulus is applied to diffuse through a dielectric cap, capping layer 36, onto an exterior surface 302 of stage 20 to form spaced and isolated dense regions 308 of fresh (nonoxidized or nonreacted) nanoparticles of the cation metal-based material on the exterior surface. In implementations where the cation metal-based material comprises bulk silver or silver oxide, silver ions diffuse through capping layer 36 onto the exterior surface of stage 20. In the example illustrated, the exterior surface of stage 20, upon which the cation metal-based material forms regions 308, is the exterior service of capping layer 36. In other implementations, capping layer 36 may, itself, be covered with another layer or other layers through which the cation metal-based material diffuses until reaching the exterior surface of the stack of layers including capping layer 36. In some implementations, an additional layer or multiple additional layers may be located between masses 28 and capping layer 36, wherein the cation metal-based material diffuses through such additional layers, prior to diffusing through capping layer 36 to reach the exterior surface upon which islands 38 are formed.

Examples of stimulus 301 that may be applied by diffusion stimulator 300 to activate stage 20 by accelerating the diffusion of the cation metal-based material through capping layer 36 include, but are not limited to, the application of heat, the application of an electric field to cause electro migration and the use of an electron beam. In some implementations, magnetostriction may be used to change a lattice of capping layer 36 to also change the diffusion coefficient of at least portions of capping layer 36 to accelerate diffusion for activation of stage 20 for use. In one implementation, diffusion stimulator 300 applies stimulus 301 in the form of heat. In one implementation, diffusion stimulator 300 applies stimulus 300 and one in the form of heat is applied by a laser. For example, in implementations where the cation metal-based material comprises bulk silver or silver oxide, diffusion stimulator 300 applies heat so as to elevate the temperature of at least selected masses 28 to a temperature of at least 280 degrees Celsius to accelerate the diffusion of the silver ions through capping layer 36. In other implementations, such masses 28 may be heated to other temperatures depending upon the material of cation metal-based masses 28 and the composition and thickness of capping layer 36.

Although diffusion stimulator 300 is schematically illustrated as applying stimulus 301 from overhead or above stage 20, in other implementations, diffusion stimulator 300 may apply stimulus 301 from beneath stage 20 or from the underlying substrate 24. For example, in some implementations, substrate 24 may include heat emitting electrical resistors below masses 28. In other implementations, structures or electrodes embedded or supported by substrate 24 may be provided to selectively provide an electric field to cause electromigration to activate stage 20.

In some implementations, each of the predefined cation metal-based masses 28, beneath capping layer 36, are concurrently activated. In other words, stimulus 301 is concurrently applied to each of the masses 28 such that the cation metal-based material of each of the masses 28 concurrently diffuses through capping layer 36 to the exterior surface of stage 20.

In yet other implementations, a subset or a portion of the total number of masses 28 underlying capping layer 36 may be activated through the application of stimulus. For example, in one implementation, diffusion stimulator 300 may be controlled by controller 312 to selectively activate selected ones of masses 28. Controller 312 may comprise a processing unit that consults a stored map identifying the location of the different masses beneath capping layer 36. Controller 312 may receive, through an input device such as a touchscreen, keyboard or the like, a selection of a desired pattern of the different masses 28 which are to be activated through the application of stimulus.

For purposes of this application, the term "processing unit" shall mean a presently developed or future developed computing hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 312 may be embodied as part of one or more application-specific integrated circuits (ASICs). Unless otherwise specifically noted, the controller is not limited to any specific combination of hardware circuitry and software, nor to any particular source for the instructions executed by the processing unit.

As indicated by block 206 in FIG. 4 and illustrated in FIGS. 7 and 8, a solution 316 containing the analyte to be tested, is deposited on the exterior surface 302 and over at least some of regions 308. As indicated by block 208 in FIG. 4 and further illustrated by FIGS. 7 and 8, SEL is performed on the solution 316 on surface 302. In particular, as illustrated by FIG. 7, a SEL light source (LS) and sensor unit 320 directs light 324 onto surface 302 and at least some of the regions 308 covered by solution 316. In one implementation, the SEL light source LS comprises a laser. The SEL light source and sensor unit 320 also serves as diffusion stimulator 300, wherein unit 320 may comprise two laser, one laser for performing diffusion stimulation in another laser for performing SEL illumination. In other implementations, diffusion stimulator 300 and its controller 312, and SEL light source and sensor unit 320 and its controller may be separate units. In one implementation, controller 312 controls unit 320 to selectively impinge those regions of surface 302 containing the formed regions 308.

As further shown by FIG. 7, light 324 interacts with the analyte of the solution on the regions 308. The light emitted, scattered, or transmitted from the analyte 328 is collected by an optical sensor provided as part of unit 320. Signals output by the optical sensor of sensor 320 are received by controller 312. Controller 312 analyzes the signals to determine characteristics of the analyte of interest in solution 316.

Figure 9:
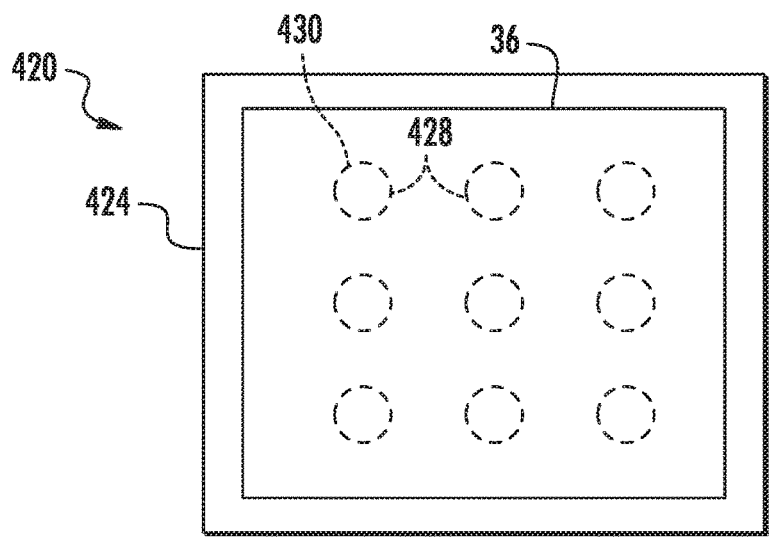
FIG. 9 is a top view of an example SEL stage.
Figure 10:
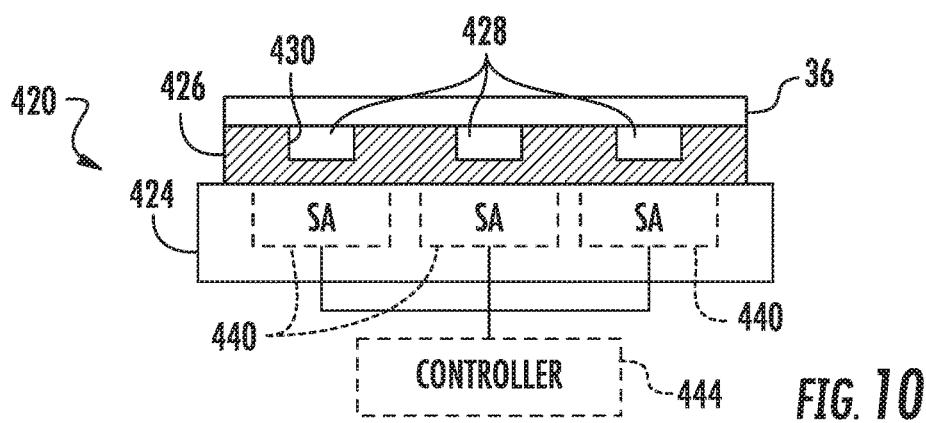
FIG. 10 is a sectional view of the example SEL stage of FIG. 9.

FIGS. 9 and 10 illustrate one example SEL stage 420. Stage 420 comprises substrate 424, diffusion barrier layer 426, cation metal-based masses 428 and dielectric capping layer 36 (described above). Substrate 424 comprises the base layer of material that supports masses 428. In the example illustrated, substrate 424 may be formed from a material that is resistant to diffusion of the cation metal-based material of masses 428. In the example illustrated, because diffusion barrier layer 426 slows or impedes diffusion of the cation metal-based material masses 428, substrate 424 may be formed from other materials, materials that have higher diffusion coefficients, such as diffusion coefficients greater than that of the cation metal-based material of masses 428.

Diffusion barrier layer 426 comprises a layer of material having diffusion coefficient greater than that of the cation metal-based material of masses 428. In one implementation, layer 426 is impermeable to diffusion of the cation metal-based material of masses 428. Diffusion barrier layer 426 inhibits masses 28 from diffusing into connection or contact with one another. At least portions of each mass 428 facing capping layer 36 are not covered or blocked by layer 426 such that masses 428, upon receiving a stimulus, may diffuse through the overlying capping layer 36. Examples of materials from which diffusion barrier layer 426 may be formed include, but are not limited to, SiN, SiC, TiN and SI3N4 and their alloys or combinations thereof.

In the example illustrated, layer 426 comprises wells 430 that contain masses 428. Each of wells 430 partially extends into layer 426 such that the floor and sidewalls of each of wells 430 are provided by layer 426. Masses 428 are deposited or formed within wells 430. Masses 428 are similar to masses 28 described above except that masses 428 are illustrated as having cylindrical shapes. As with capping layer 36 in stage 20, capping layer 36 in stage 420 extends over masses 428, sandwiching masses 428 between capping layer 36 and substrate 424. Capping layer 36 slows or inhibits oxidation of the cation metal-based materials forming masses 428. At the same time, capping layer 36 is formed from a material or a group of materials that block or resist diffusion of the cation metal-based material of masses 428, but which offer accelerated diffusion of masses 428 in response to the cation metal-based material being stimulated. Diffusion of the cation metal-based material of masses 428 through capping layer 36 results in the cation metal-based material depositing or forming upon the surface of capping layer 36 or results in the cation metal-based material masses 428 diffusing through capping layer 36 and any additional non-diffusion blocking layers of material that may exist between capping layer 36 and masses 428 or that may extend over and above capping layer 36.

In one implementation, capping layer 36 comprises a porous dielectric layer that has a low coefficient of diffusion with respect to a silver-based material but which offers an accelerated rate of diffusion for the silver-based material in response to the silver-based material being stimulated. For example, in one implementation, capping layer 36 may comprise TEOS oxide ($SiO_2$). In yet other implementations, capping layer 36 may be formed from other materials.

As shown by broken lines, in some implementations, stage 420 may incorporate elements which are part of diffusion stimulator 300 (schematically shown in FIG. 5). In the example illustrated, stage 420 may additionally comprise stimulus applicators 440. Each of applicators 440 is to selectively apply stimulus to the cation metal-based material of masses 428 within wells 430. In the example illustrated, each of the individual masses 428 may be provided with an individual assigned stimulus applicator 440, facilitating application of stimulus to individual masses 428. In other implementations, stage 420 may comprise a single stimulus applicator for all of masses 428 or may comprise multiple stimulus applicators, wherein each stimulus applicator apply stimulus to a subset of multiple masses 428 of the total number of masses 428.

In the example illustrated, stimulus applicators 440 are supported by substrate 424 generally opposite to and below each of wells 430 containing masses 428. In the example illustrated, stimulus applicators 440 are at least partially embedded within substrate 424. In other implementations, stimulus applicator 440 may be provided in layer 426. In the example illustrated, each of stimulus applicator 440 have an electrical contact pad, port or other mechanism facilitating connection to an external, separate controller 444. In yet other implementations, controller 444 may be incorporated as part of stage 420.

In one implementation, each of stimulus applicators 440 comprises a heater to apply stimulus in the form of heat to an associated mass 428. For example, in one implementation, each of stimulus applicators 440 comprises an electrical resistor and an associated transistor to selectively supply current across the electrical resistor so as to selectively generate heat. In yet other implementations, each of stimulus applicators 440 may comprise electrodes arranged to create an electrical field with respect to an associated mass 428 to cause electro migration and diffusion of the cation metal-based material of the associated mass 428 through capping layer 36. In yet other implementations, stimulus applicators 440 may comprise other mechanisms that, when activated, accelerate diffusion of the cation metal-based material from wells 430 through capping layer 36 and onto the exterior surface 302.

Figure 11:
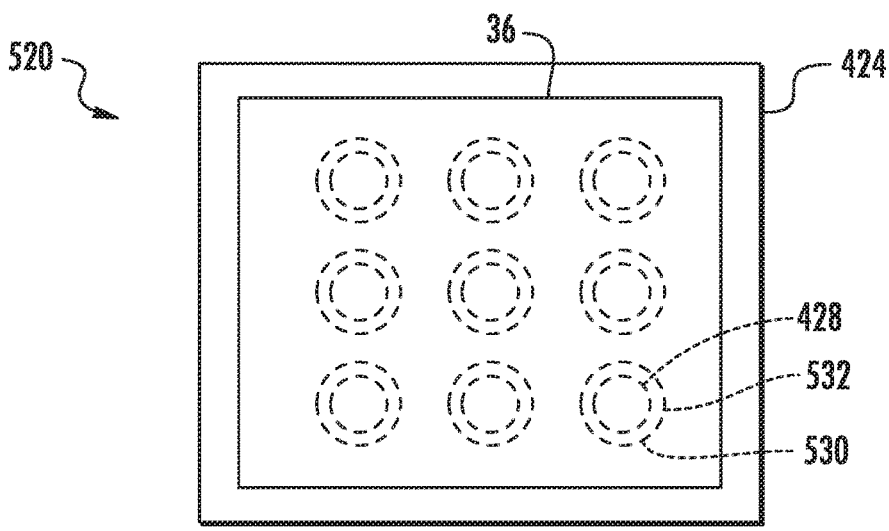
FIG. 11 is a top view of an example SEL stage.
Figure 12:
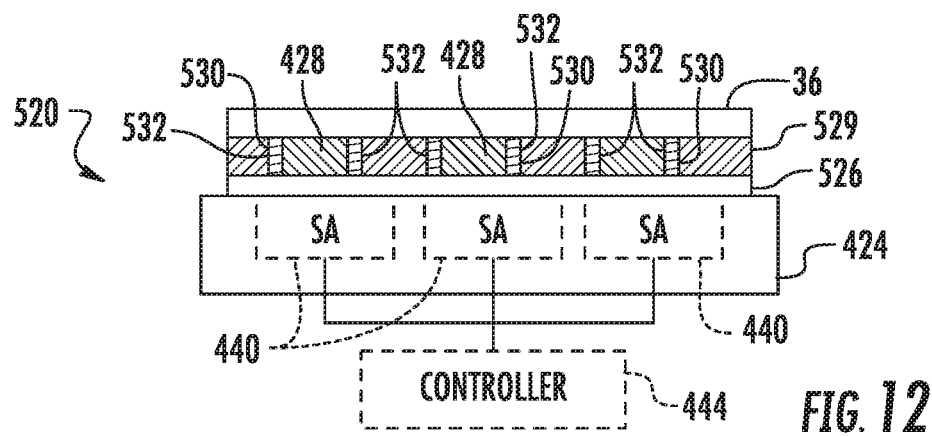
FIG. 12 is a sectional view of the example SEL stage of FIG. 11.

FIGS. 11 and 12 illustrate an example SEL stage 520. Stage 520 is similar to stage 420 except that stage 520 comprises diffusion barrier layer 526, well forming layer 529 and well sidewall liners 532. The remaining components of stage 520 which correspond to stage 420 are numbered similarly.

Diffusion barrier layer 526 is similar to diffusion barrier layer 426 except that layer 526 does not itself include wells, but comprises a layer underlying wells 530 which are formed in layer 529. In one implementation, layer 526 has a thickness of at least 0.3 um Layer 529 comprises a layer formed on layer 526 in which wells 530 are formed. Wells 532 extend completely through layer 529. Layer 529 may comprise a material that has a higher diffusion coefficient as compared to cation metal-based masses 428. In one implementation, layer 529 may be formed from materials such as copper, nickel, gold, and the like.

Well sidewall liners 532 comprise layers that line the interior side walls of wells 532 formed layer 529. Sidewall liners 532 have a diffusion coefficient less than that of the material of layer 529. Sidewall lines 532 have a diffusion coefficient less than that of cation metal-based material of masses 428 in wells 530. In one implementation, sidewall liners 532 are formed from the same material forming diffusion barrier layer 526. Sidewall liners 530 to facilitate the formation of layer 529 from materials having a diffusion coefficient greater than that of the cation metal-based material of masses 428. In one implementation, sidewall well liners 532 are formed from a material such as SiN, SiC, TiN and $SI_3N_4$ and have a thickness of at least 0.3 um.

Figure 13:
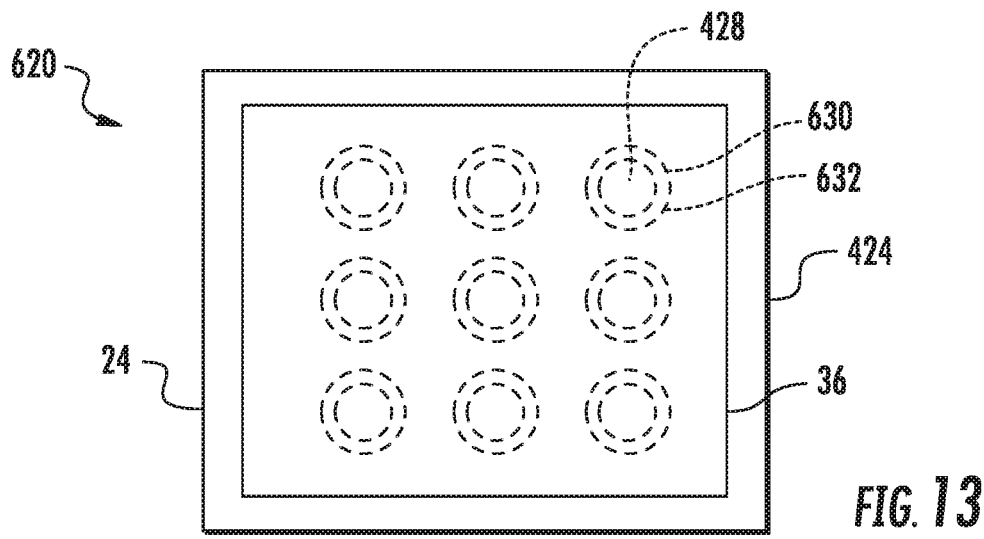
FIG. 13 is a top view of an example SEL stage.
Figure 14:
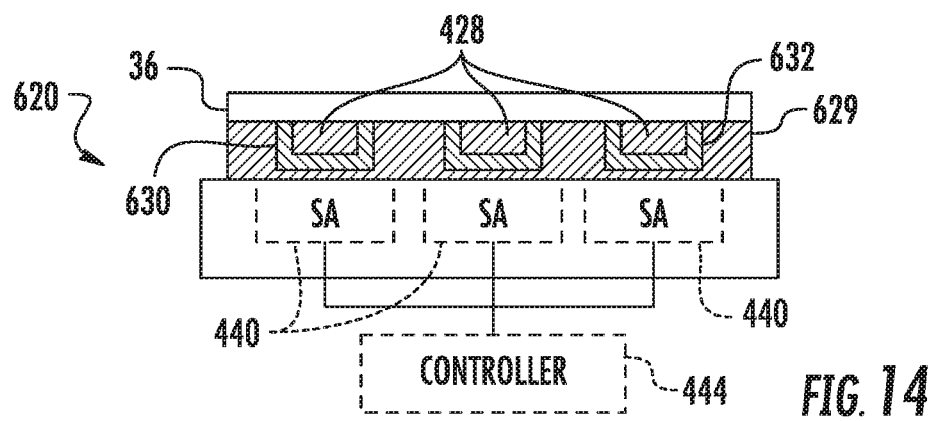
FIG. 14 is a sectional view of the example SEL stage of FIG. 13.

FIGS. 13 and 14 illustrate an example SEL stage 620. Stage 620 is similar to stage 420 except that stage 620 comprises well forming layer 629 in place of diffusion barrier layer 426 and further comprises well liners 632. Those remaining components of stage 620 which correspond to components of stage 420 are numbered similarly.

Well forming layer 629 forms wells 630. Well forming layer 629 is similar to well forming layer 529 described above except that layer 629 forms or defined both the sidewalls and floor of each of wells 630. Layer 629 may comprise a material that has a higher diffusion coefficient as compared to cation metal-based masses 428. In one implementation, layer 629 may be formed from materials such as copper, nickel, gold, and the like. Wells 630 extend partially into layer 629 and contain cation metal-based material 428.

Well liners 632 comprise coatings, films or other layers of material covering the floor and sidewalls of wells 630. The material forming well liners 632 has a diffusion coefficient less than that of the material of layer 629. Sidewall lines 632 have a diffusion coefficient less than that of cation metal-based material of masses 428 in wells 630. Sidewall liners 632 facilitate the formation of layer 629 from materials having a diffusion coefficient greater than that of the cation metal-based material of masses 428. In one implementation, sidewall well liners 632 are formed from a material such as SiN, SiC, TiN and $SI_3N_4$ and have a thickness of at least 0.3 um.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence (SEL) sensing system comprising: an activatable SEL sensor stage comprising: a substrate; cation metal-based material masses supported by the substrate, the cation metal-based material masses at different locations along a surface of the substrate; diffusion barriers separating and isolating the cation metal-based masses, the diffusion barriers comprising a solid diffusion barrier material having a diffusion coefficient less than a diffusion coefficient of the cation metal-based material masses and surrounding sides of each of the cation metal-based material masses; and a dielectric capping layer over the cation metal-based material masses to inhibit oxidation of the cation metal-based material masses.

2. The SEL sensing system of claim 1, wherein the activatable SEL sensor stage further comprises wells containing the cation metal-based material masses, wherein the diffusion barriers comprise well sidewall liners.

3. The SEL sensing system of claim 2, wherein the cation metal-based material of each of the masses has a first diffusivity through the well sidewall layers in response to a stimulus and a second diffusivity through the dielectric capping layer in response to the stimulus, the second diffusivity being greater than the first diffusivity.

4. The SEL sensing system of claim 3, wherein the first diffusivity is zero.

5. The SEL sensing system of claim 3, wherein each well further comprises a floor and wherein the diffusion barriers further comprise well floor liners, wherein the cation metal-based material of each of the masses has a third diffusivity through the well floor liners in response to the stimulus, the third diffusivity being less than the second diffusivity.

6. The SEL sensing system of claim 1, wherein the diffusion barrier material has a diffusion coefficient less than that of silver ions.

7. The SEL sensing system of claim 1, wherein the cation metal-based material of each of the masses comprises a silver based material.

8. The SEL sensing system of claim 1 further comprising a diffusion stimulator to selectively apply a stimulus to selected ones of the cation metal-based material masses underlying the dielectric capping layer so as to diffuse the selected ones of the cation metal-based material masses through the dielectric capping layer and onto a surface of the dielectric capping layer.

9. The SEL sensing system of claim 8, wherein the diffusion stimulator is supported by the substrate below the cation metal-based material masses.

10. The SEL sensing system of claim 1 further comprising a controller to consult a stored map identifying a location of different ones of the Acacian metal-based material masses supported by the substrate beneath the capping layer, wherein the controller is to selectively stimulate selected ones of the cation metal-based material masses with a stimulus that diffuses the selected ones of the cation metal-based material masses through the dielectric capping layer and onto a surface of the dielectric capping layer.

11. The SEL sensing system of claim 1, wherein the dielectric capping layer comprises TEOS oxide.

12. The SEL sensing system of claim 1 further comprising stimulus applicators, each of the stimulus applicators to apply a stimulus to a subset of the cation metal-based material masses, wherein application of the stimulus to the subset of cation metal-based material masses causes the subset of cation metal-based masses to diffuse through the dielectric capping layer onto a surface of the dielectric capping layer.

13. The SEL sensing system of claim 1 further comprising a stimulus applicator embedded within the substrate.

14. A method for actuating and using an activatable surface enhanced Raman spectroscopy sensor stage, the method comprising:
applying a stimulus to isolated masses of cation metal-based material so as to cause the cation metal-based material to diffuse through a dielectric cap onto a surface;
performing surface enhanced luminescence with respect to an analyte on the surface.

15. The method of claim 14, wherein the application of the stimulus to the isolated masses of the cation metal-based material comprises selectively applying the stimulus to a subset of a total number of isolated masses of cation metal-based material.

16. The method of claim 14, wherein the masses of cation metal-based material are isolated by diffusion barriers separating the masses of cation metal-based material.

17. The method of claim 14, wherein the stimulus is selected from a group of stimuli consisting of: heat, an electric field, an electron beam and magnetostriction.

18. A surface enhanced luminescence (SEL) sensing system comprising:
an activatable SEL sensor stage comprising:
a substrate;
cation metal-based material masses supported by the substrate;
diffusion barriers separating and isolating the cation metal-based masses;
a dielectric capping layer over the cation metal-based material masses to inhibit oxidation of the cation metal-based material masses; and
a stimulus applicator to apply a stimulus to a cation metal-based material mass of the masses, the stimulus accelerating diffusion of the cation metal-based material mass through the dielectric capping layer onto the dielectric capping layer.

19. The SEL sensing system of claim 18, wherein the diffusion barriers comprise voids separating the cation metal-based material masses.

20. The SEL sensing system of claim 18, wherein the activatable SEL sensor stage further comprises wells containing the cation metal-based material masses, wherein the diffusion barriers comprise walls of the wells, and wherein the cation metal-based material of each of the masses has a first diffusivity through the walls in response to the stimulus and a second diffusivity through the dielectric capping layer in response to the stimulus, the second diffusivity being greater than the first diffusivity.

* * * * *